US00RE34614E

United States Patent [19]

Gentiluomo

[11] E Patent Number: Re. 34,614

[45] Reissued Date of Patent: May 24, 1994

[54] BOWLING BALL

[76] Inventor: Joseph A. Gentiluomo, 1456 Belmont Ave., Schenectady, N.Y. 12308

[21] Appl. No.: 867,529

[22] Filed: Apr. 13, 1992

Related U.S. Patent Documents

Reissue of:

[64] Patent No.: 5,098,096
Issued: Mar. 24, 1992
Appl. No.: 607,752
Filed: Oct. 31, 1990

U.S. Applications:

[63] Continuation-in-part of Ser. No. 425,397, Oct. 20, 1989, abandoned, which is a continuation-in-part of Ser. No. 628,158, Jul. 5, 1984, abandoned, which is a continuation-in-part of Ser. No. 171,897, Jul. 24, 1980, abandoned.

[51] Int. Cl.[5] ..... A63B 37/04

[52] U.S. Cl. ..... 473/126; 273/DIG. 20

[58] Field of Search ..... 273/63 E, 63 G, 63 R, 273/63 D, DIG. 20

[56] References Cited

U.S. PATENT DOCUMENTS

| | | | |
|---|---|---|---|
| 2,291,738 | 8/1942 | Luth et al. | 273/63 E |
| 3,353,825 | 11/1967 | Bach | 273/63 R |
| 3,400,929 | 9/1968 | Fabanich | 273/63 E |
| 4,121,828 | 10/1978 | Amburgey | 273/63 E |
| 4,131,277 | 12/1978 | Randolph | 273/63 G |
| 4,522,397 | 6/1985 | Miller | 273/63 D |
| 4,802,671 | 2/1989 | Gentiluomo | 273/63 E |

OTHER PUBLICATIONS

Tour D'Force by Larry Lichstein, Bowlers Journal, p. 36, Oct. 1990.

Lorain's 'Faball' Has Done It All by D. J. Younkin, Bowler's Journal, Apr. 13, 1991.

"Bowling", p. 28, Jul. 10, 1975.

*Primary Examiner*—Benjamin H. Layno

[57] ABSTRACT

A bowling ball wherein the weights of the inner core and the encapsulating mass are varied through the use of materials of preselected densities, for the purpose of manufacturing balls having a low moment of inertia. The instant invention accomplishes this by featuring an inner core having a minimum specific gravity of 0.1063 per pound of ball weight, and a construction wherein the volume ratio of the inner core to that of the encapsulating mass, in conjunction with the specific gravity ratio of the inner core to that of the encapsulating mass, yields a [maximum] *low* moment of inertia [(about the ball's vertical axis) of 0.318 in-ozs-sec$^2$ per pound of ball weight]. As the moment of inertia of a fixed weight ball is decreased, the translational kinetic energy increases and the rotational kinetic energy decreases. However, since the translational kinetic energy increases at a greater rate than the rate at which the rotational kinetic energy decreases, the resulting effect is an increase in total kinetic energy output. An additional increase in total kinetic energy output is obtained through use of a high density top weight mass concentrated closely around the ball's inner core[, with its lower surface positioned at the midplane of the ball].

28 Claims, 1 Drawing Sheet

BOWLING BALL

Matter enclosed in heavy brackets [ ] appears in the original patent but forms no part of this reissue specification; matter printed in italics indicates the additions made by reissue.

This is a *reissue of application Ser. No. 07/607,752 filed Oct. 31, 1990 now U.S. Pat. No. 5,098,096, which is a* continuation-in-part of application Ser. No. 07/425,397 filed Oct. 20 1989 *now* abandoned, which was a continuation-in-part of application Ser. No. 06/628,158 filed Jul. 5, 1984 *now* abandoned, which was a continuation-in-part of application Ser. No. 06/171,897 filed Jul. 24, 1980, *now* abandoned.

BACKGROUND OF THE INVENTION

This invention relates to game bowling balls having a minimum weight of 8 pounds.

Regulation game bowling balls are made to American Bowling Congress specifications which state in part that bowling balls shall be constructed of non-metallic composition materials, having a maximum circumference of 27.002 inches, a minimum circumference of 26.704 inches, and a minimum ball surface hardness of 72 Shore D durometer. Ilso, the top portion of the ball shall not be more than 3 ounces greater than the bottom portion for balls 10 pounds or more, and the top portion of the ball shall not be more than 1 ounce greater than the bottom portion for balls less than 10 pounds, after finger and thumb hole drilling.

Most presently manufactured bowling balls are made of uniform density material throughout, or with a rubber or resin cover material encapsulating a conventional inner core, thereby providing a bowling ball having less than optimum total kinetic energy output. It is an advantageous feature of this invention to relocate an outer portion of a ball's weight toward the center. This weight distribution provides for a lower moment of inertia, a feature that is desirable when greater total kinetic energy output is desired. Greater total kinetic energy output will operate to provide more ball hooking action, and more ball drive and mixing action when hitting the pins, than is obtainable with presently available bowling balls. Also, instead of locating the top weight mass toward the surface of the ball as disclosed by Luth et al. (U.S. Pat. No. 2,291,738), Satchell (U.S. Pat. No. 3,068,007), and Sauer (U.S. Pat. No. 2,414,672), this invention offers an option by locating the top weight mass as close as possible [around] *to* the high density inner core.

SUMMARY OF THE INVENTION

The intent of this invention is to provide a bowling ball having greater total kinetic energy output, by constructing the ball such that the combination of translational and rotational kinetic energies are greater than those of presently available balls. The increase in total kinetic energy is accomplished by decreasing the moment of inertia of a predetermined weight ball so that it can provide a greater output of work. It is to be noted that as the moment of inertia of a fixed weight ball is decreased, the translational kinetic energy increases and the rotational kinetic energy decreases. However, the translational kinetic energy increases at a greater rate than the rate at which the rotational kinetic energy decreases, thus resulting in an increase in total kinetic energy. As the moment of inertia of a fixed weight ball is decreased, the distance the ball travels decreases before pure uniform rolling motion impends(ball skidding with rolling action ceases), and the total kinetic energy output of the ball increases. This means that a fixed weight ball of lower moment of inertia will start pure rolling action sooner and posses greater total kinetic energy at the instant pure rolling commences. As a result, the ball will track sooner for better bowler control, to provide increased hooking action with increased total kinetic energy when hitting the pins.

For example, through theoretical analysis, a presently available prior art 16 pound ball having a calculated moment of inertia of about 0.0255 ft-lbs-sec$^2$, will when thrown with an initial linear velocity of about 30'/sec and an initial angular velocity of about 12 Rad./sec, will provide a calculated total kinetic energy output of about 179 ft-lbs. A 16 pound ball constructed to the instant invention with a calculated moment of inertia of about 0.0165 ft-lbs-sec$^2$ will when thrown with an initial velocity of about 30'/sec and an initial angular velocity of about 12 Rad./sec, will provide a calculated total kinetic energy output of about 191 ft-lbs.

In order for a bowler to throw a ball with sufficient total kinetic energy to provide for proper pin action, the initial velocity with which the said ball is delivered should be maintained at about 30'/sec with a 16 pound ball. For example, if a bowler throws the above cited presently available 0.0255 ft-lbs-sec$^2$ moment of inertia 16 pound prior art ball with an initial linear velocity of about 25'/sec and an initial angular velocity of about 12 Rad./sec, the calculated total kinetic energy output would be only about 127 ft-lbs. However, if in order to obtain more velocity on the ball, the bowler selects a presently available 0.022 ft-lbs-sec$^2$ moment of inertia 14 pound ball and delivers it with an initial velocity of about 30'/sec and an initial angular velocity of about 12 Rad./sec, said delivered ball would provide about 156 ft-lbs of calculated kinetic energy. If instead, the bowler used a 14 pound ball of the instant invention having a calculated moment of inertia of about 0.0139 ft-lbs-sec$^2$, and delivers it with an initial linear velocity of about 30'/sec and an initial angular velocity of about 12 Rad/-sec, said ball would provide a calculated total kinetic energy of about 168 ft-lbs, compared with the above cited 156 ft-lbs for a 14 pound presently available prior art ball. All of above cited values for total kinetic energy output of the instant invention were obtained from consideration of a bowling ball structural arrangement consisting only of a high density inner core in conjunction with a molded encapsulating mass. Also, a 3 inch diameter sintered tungsten carbide inner core and a one half inch thick ployurethane resin cover, were used for above cited 16 and 14 pound balls of the instant invention.

Ball moment of inertia in the instant invention is decreased when compared to a presently available prior art bowling ball of equal weight, by design-wise removing weight from the outer portion of said prior art ball and by various means design-wise redistributing said removed weight to the innermost portion of the ball. Therefore, it is apparent that the main intent of this invention is to provide a high density inner core type bowling ball that has substantially improved operating characteristics.

Accordingly, objects of this invention are as follows:

To reduce, or possibly eliminate, the disadvantage experienced by a bowler who cannot handle and control a heavy weight ball.

To provide a ball that will more fully satisfy the demands of bowlers of varying skills.

To provide a ball concept applicable to the manufacture of a vaiiety of balls of different weights.

To provide a ball having greater total output energy than a prior art ball, when delivered with the same initial linear and angular velocities.

To provide a ball having approximately the same total output energy as a heavier prior art ball of greater moment of inertia.

To provide a ball that features lower moment of inertia to provide greater total output energy.

To provide a ball having better ability to mix the pins with less ball deflection within a slippery pin deck area, due to the greater availability of total output energy when compared to a prior art ball.

To provide a ball that will track sooner for the purpose of providing proper hooking action on a fast lane where balls do not hook readily.

To provide a ball that can be used to develop additional hooking action not initially imparted by the bowler.

To provide a ball with substantially increased total energy output for the purpose of providing effective ball drive and mixing action upon hitting the pocket to knock over pins.

To provide a ball that can be manufactured to American Bowling Congress specifications.

These objects and other objects will become apparent when taken in conjunction with the description, claims, and accompanying drawing, in which:

Terms herein utilized should bear interpretation such as follows:

Inner Core—It is defined as the innermost mass that is surrounded by the molded encapsulating mass, which may or may not integrally include top weight mass.

*Encapsulating Mass—It is defined to encompass the element or elements totally surround the ball's inner core.*

Inner Core Density or Specific Gravity—It represents the value obtained when dividing the total weight (in grams) of the inner core, by the total volume (in cubic centimeters) of the inner core.

True Particle Density—This density corresponds to the weight of an average particle divided by its real volume.

[Ball's Vertical Axis—It is defined as an axis running through the ball between its top and bottom. The top of the ball being that portion which contains the top weight mass.]

Bowling Ball—It refers to any presently available game bowling ball.

Moment of Inertia—It is defined as the sum of the product of the mass of each particle in a rigid body and the square of its distance from a common axis, or the ratio of the resultant external torque to the angular acceleration with respect to said axis.

Translational Kinetic Energy—It is equal to one-half the body mass, times the square of body velocity.

Rotational Kinetic Energy—It is equal to one-half the moment of inertia of the body about its center of rotation, times the square of the body's angular velocity.

Total Kinetic Energy—It is the summation of translational and rotational kinetic energy.

Calculated Moment of Inertia—It represents the moment of inertia obtained through calculations based on equations which are well known in the art.

Calculated Total Kinetic Energy—It represents the total kinetic energy obtained through calculations based on equations which are well known in the art.

Syntactic Foam—It is defined as a lightweight material consisting of hollow spheres of either phenolic, epoxy, ceramic, or glass, dispersed in rubber or within a thermosetting resin such as epoxy, polyester, polyurethane, etc.

DESCRIPTION OF THE INVENTION

Figure 1:
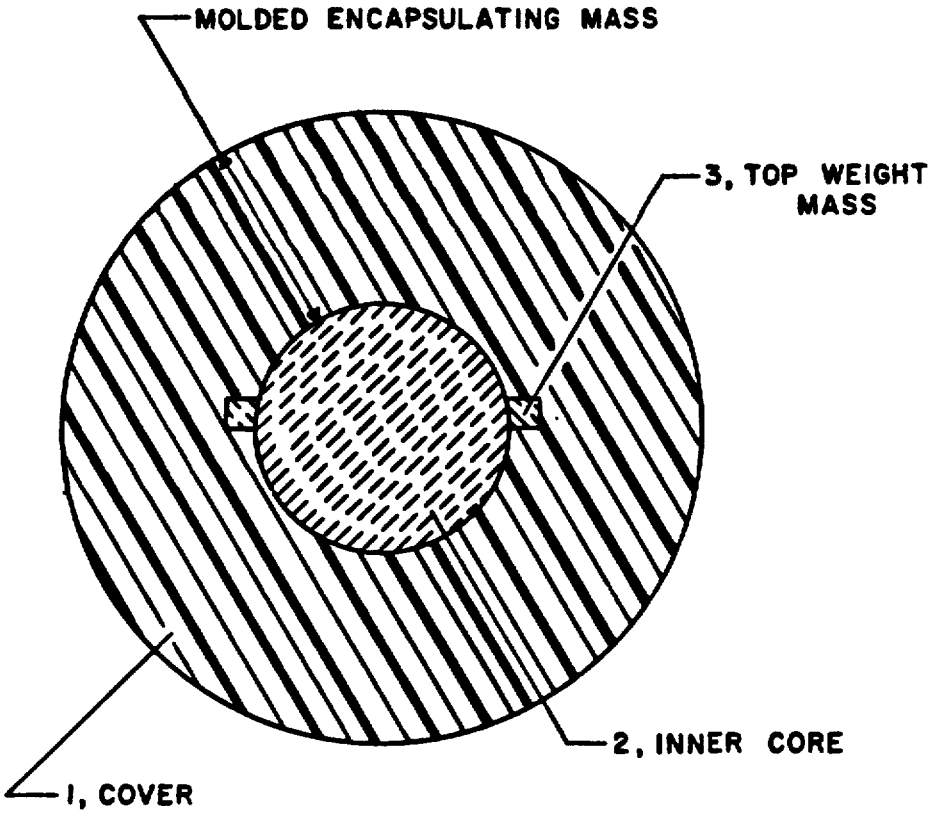
FIG. 1 depicts a sectional view of a bowling ball having substantially an inner core and a cover.
Figure 2:
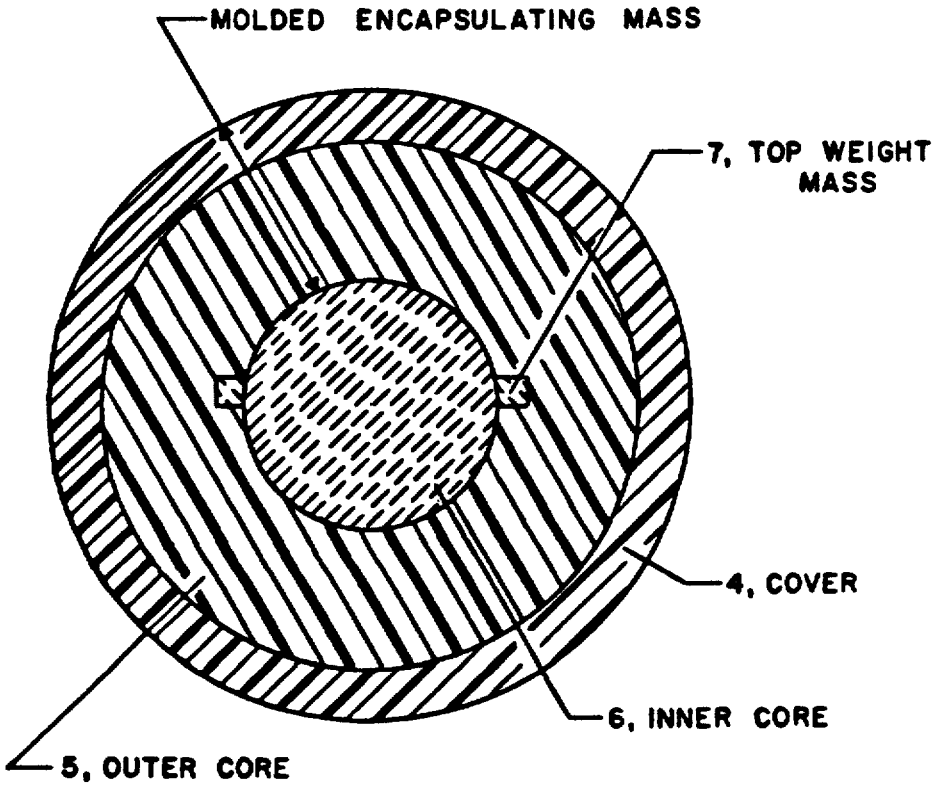
FIG. 2 depicts a sectional view of a bowling ball having substantiall an inner core, an outer core, and a cover.

Generally, the bowling balls illustrated in FIGS. 1 and 2, and described herein as two embodiments of the instant invention, preferably comprise a [spherical] high density solid inner core [having its center substantially coincident with the ball's geometrical center]; a molded encapsulating mass surrounding said inner core, which exists as a cover in the FIG. 1 embodiment, and as an outer core and cover in the FIG. 2 embodiment; and an annular top weight mass located within the molded encapsulating mass and disposed closely [around] *to* the high density inner core [with its lower surface located at the midplane of the inner core]. Said encapsulating mass being characterized as including one or more [spherical] shells. It should be noted that the annular top weight mass, which is used to offset the loss of weight resulting from drilling the thumb and finger holes, and also if desired, to provide for the maximum ABC allowable 3 ounce out-of-balance permitted between the top and bottom of balls 10 pounds or more, is placed as close to the inner core as possible in order to assist toward further decreasing the moment of inertia of the ball over and above the reduction obtained through use of the high density [spherical] inner core alone. The annular top weight mass may be manufactured [integral with] *as a part of* the inner core, or as a separate piece closely positioned [around] *to* the inner core. It should be further noted that bowling balls of this invention can be manufactured to include either the presently used conventional top weight blocks, or the novel high density annular top weight mass herein disclosed. The size and density of the inner core is selected as a function of the amount of total kinetic energy output desired for a ball of predetermined weight, and the density of the top weight mass is selected as a function of the amount of further decrease in moment of inertia desired over and above that provided solely by the utilization of a high density inner core. The denser the annular top weight mass [surrounding the inner spherical core and concentrated] *located* close to [the midplane of the ball] *the inner core,* the greater will be the reduction in ball moment of inertia. Also, the denser the material used for the inner core, resulting from relocating weight removed from the outer portion of a ball, the greater the reduction in ball moment of inertia.

Referring to FIG. 1 of the drawing, one embodiment of this invention will include a [spherical] *dense* inner core 2 made from inorganic compounds including such bonded powdered ceramics as tungsten carbide, thoria, zirconia, alumina, or bonded powdered minerals such as copper oxide, lead oxide, zinc oxide, etc. Also, the annular top weight mass 3 can be made from the same bonded ceramic or mineral materials as used for the inner core. During ball manufacture, inner core 2 [with integrally attached] *including* annular top weight mass 3, are supported within the [spherical] cavity of a two section split mold by a support pin such as disclosed in Randolph (U.S. Pat. No. 4,131,277). Cover 1 is formed when a liquid casting resin is poured to fill the mold cavity around inner core 2 and top weight mass 3. Cover 1 can be made from rubber and such thermosetting resins as filled, unfilled, modified or unmodified polyurethane, polyester, alkyd, acrylic, epoxy, etc. Filled rubber and resins include high density powdered materials such as barium sulfate, iron oxide, zinc oxide, or lead oxide, and low density syntactic foams having hollow spheres of either epoxy, phenolic, ceramic, or glass embedded within the base material. Modified resins include another resin or elastomer mixed with the base resin. For example, epoxy mixed with the polyurethane based resin. After the ball is removed from the mold, the hole produced by the support pin is filled with a resin equivalent in density to that of cover 1. The ball is then ready for finishing to the prescribed diameter approved by the ABC. It should be noted that [spherical] inner core 2 and annular top weight mass 3, can be manufactured by means of the sintering process, well known in the ceramic art. Also, they can be formed by cold pressing a mixture of such bonding resins as epoxys polyester, phenolic, polyurethane, etc. with any of the powdered or grained ceramics or minerals cited, and allowing the resin binder to set. It should be noted that the true particle density of tungsten carbide is about 12 to 16 gm/cc, that of thoria is about 10.5 gm/cc, that of zirconia is about 6.1 gm/cc, that of alumina is about 3.4 to 3.9 gm/cc, that of copper oxide is about 6.0 gm/cc, that of lead oxide is about 9.3 to 9.7 gm/cc, and that of zinc oxide is about 5.6 gm/cc. It should be noted that the densities of sintered materials are substantially equal to the above cited true particle densities, whereas the densities of resin bonded ceramics or minerals are substantially less than the above cited true particle densities. For example, resin bonded alumina can be readily molded to composition densities from about 1.7 gm/cc to about 2.2 gm/cc, resin bonded barium sulfate can be readily molded to densities from about 1.7 gm/cc to about 3.2 gm/cc, resin bonded iron oxide can be readily molded to densities from about 1.7 gm/cc to about 3.4 gm/cc, resin bonded zinc oxide can be readily molded to densities from about 1.7 gm/cc to about 3.6 gm/cc, and resin bonded lead oxide can be readily molded to densities from 1.7 gm/cc to about 6.2 gm/cc. Based on above cited composition densities, inner cores can be molded having density values of 1.7 gm/cc or larger. To obtain the claimed minimum inner core specific gravity per pound of ball weight, 1.7 is divided by the ball weight of 16 pounds, to yield a value of 0.1063. It should be obviously noted that balls can also be made having inner core specific gravity values per pound of ball weight greater than the above cited 0.1063. Also, the density of hard rubber such as ebonite is about 1.15 gm/cc, that of polyurethane resin is about 1.04 to 1.40 gm/cc, that of polyester resin is about 1.05 to 1.46 gm/cc, that of alkyd resin is about 1.90 to 2.30 gm/cc, that of acrylic resin is about 1.08 to 1.20 gm/cc, and that of epoxy resin is about 1.10 to 1.40 gm/cc. syntactic foams can range in density from about 0.38 to 1.0 gm/cc, depending on the amount of lightweight filler added to the rubber or resin base material.

Referring to FIG. 2 of the drawing, the second embodiment of this invention will include [a spherical] *an* inner core 6 made from bonded powdered ceramics such as tungsten carbide, thoria, zirconia, or alumina, or bonded powdered minerals such as copper oxide, lead oxide, or zinc oxide. Also, the geometrically shaped annular top weight mass 7 can be made from the same bonded ceramics or minerals as the inner core. During ball manufacture, [spherical] inner core 6 [with integrally attached] *including* annular top weight mass 7 are supported within the [spherical] cavity of a two section split mold by a support pin such as disclosed in Randolph (U.S. Pat. No. 4,131,277). When outer core 5 is made from filled or unfilled casting resins such as polyurethane, polyester, alkyd, acrylic, epoxy, etc., the casting resin is poured around inner core 6 and top weight mass 7, and allowed to set up. After removal from the mold, the core can be finished to a prescribed diameter. The filled resins can include low density granular or powdered materials such as hollow spheres of various materials, *including* sawdust or cork, when a material of lower density than the base resin is desired. To make the outer core 5 of a higher density than the base resin, filler materials such as barium sulfate, iron oxide, zinc oxide, or lead oxide powders may be used. Outer core 5 can also be made from molded composition cork, bonded sawdust, syntactic foam, rigid polyurethane foam, and rigid polyvinyl chloride foam, by manufacturing means well known in the art. The density of syntactic foam is about 1.0 gm/cc or less, that of rigid polyurethane foam is about 0.016 to 0.96 gm/cc, that of rigid polyvinyl chloride foam is about 0.064 to 0.40 gm/cc, and that of composition cork is about 0.19 to 0.48 gm/cc.

[Spherical outer] *Outer* core 5, with support pin hole therein, is then placed within another [spherical] split section mold of such diameter as to allow for a prescribed cover thickness. The core 5 assembly is held in place within the mold by a support pin which engages the support pin hole obtained when outer core 5 was cast. Next, cover 4 is formed when a liquid casting resin is poured to fill the mold cavity around outer core 5. Cover 4 can be made from syntactic foam, hard rubber such as ebonite, and such resins as modified or unmodified polyurethane polyester, alkyd, acrylic, epoxy, etc., having a minimum Shore D durometer hardness of 72. After the cover resin sets up, the mold is opened and the ball removed. The support pin hole within outer core 5 of the ball will be filled with a material equivalent in density to that of said outer core 5. Also, the support pin hole in cover 4 will be filled with a resin equivalent in density to that of cover 4. The ball is finally ready for finishing to the prescribed diameter approved by ABC. It should be noted that inner core 6 and annular top weight mass 7 are manufactured by means herein previously disclosed.

In bowling balls of the instant invention, the weights of the inner core, outer core, and cover, may be varied through use of materials of preselected densities, for the purpose of manufacturing balls having moments of inertia lower than presently available bowling balls.

The instant invention accomplishes this by featuring an inner core having a minimum specific gravity of 0.1063 per pound of ball weight, and a ball construction wherein the volume ratio of the inner core to that of the encapsulating mass, in conjunction with the specific gravity ratio of the inner core to that of the encapsulating mass, yields a [maximum] *low* moment of inertia

[about the ball's vertical axis of 0.318 in-ozs-sec$^2$] per pound of ball weight.

In order that this invention may be more fully understood, the following illustrative examples are presented:

EXAMPLE I

A prior art 16 pound ball having a diameter of 8.580", will have a moment of inertia of about 0.02547 ft-lbs-sec$^2$. Now a 16 pound ball made to the instant invention and having a 4.884" diameter inner core, a 7.080" diameter outer core, and an 8.580" cover diameter, will provide a calculated moment of inertia of about 0.02072 ft-lbs-sec$^2$(0.24864 in-ozs-sec$^2$).

EXAMPLE II

A prior art 14 pound ball having a diameter of 8.580", will have a moment of inertia of about 0.02458 ft-lbs-sec$^2$. Now, a 14 pound ball made to the instant invention and having a 4.469" diameter inner core, a 7.080" diameter outer core, and an 8.580" cover diameter, will provide a calculated moment of inertia of about 0.01907 ft-lbs-sec$^2$(0.26153 in-ozs-sec$^2$).

EXAMPLE III

A prior art 10 pound ball having a diameter of 8.580", will have a moment of inertia of about 0.01999 ft-lbs sec$^2$. Now, a 10 pound ball made to the instant invention and having a 3.267" diameter inner core, a 7.080" diameter outer core, and an 8.580" cover diameter, will provide a calculated moment of inertia of about 0.01685 ft-lbs-sec$^2$(0.3235 in-ozs-sec$^2$).

In the above cited examples, the inner core has a density of about 0.143 #/in$^3$(3.96 gm/cc), the outer core has a density of about 0.0026 #/in$^3$(0.072 gm/cc), and the cover has a density of about 0.048 #/in$^3$(1.33 gm/cc).

Having thusly described the invention, the following is claimed:

[1. A bowling ball, comprising:

a) an inner core having a minimum specific gravity of 0.1063 per pound of ball weight, for balls ranging in weight from 8 to 16 pounds;

b) a molded encapsulating mass surrounding said inner core, wherein its specific gravity ranges downward to a minimum value of 0.38 for a specific fixed weight ball, to effectuate a decrease in ball moment of inertia;

c) the specific gravity of said inner core being greater than that of said encapsulating mass;

d) said ball moment of inertia decreases with an increase in inner core density, to effectuate a maximum moment of inertia about the ball's vertical axis of 0.318 in-ozs-sec$^2$ per pound of ball weight, for the purpose of obtaining an increase in the total kinetic energy output of said ball.]

[2. The bowling ball defined in claim 1, wherein said molded encapsulating mass is further characterized as a cover.]

[3. The bowling ball defined in claim 2, further characterized as including top weight mass.]

[4. The bowling ball defined in claim 3, wherein said top weight mass is further characterized as being integral to said inner core.]

[5. The bowling ball defined in claim 4, wherein said top weight mass is further characterized as being annular in shape.]

[6. The bowling ball defined in claim 5, wherein said inner core is further characterized as (spherical in shape) having a minimum volume of 14.137 cubic inches.]

[7. The bowling ball defined in claim 1, wherein said inner core minimum specific gravity per pound of ball weight, is further characterized as being increased by the amount of 0.0187, to a value of 0.1250.]

[8. The bowling ball defined in claim 1, wherein said inner core minimum specific gravity per pound of ball weight, is further characterized as being increased by the amount of 0.03745, to a value of 0.14375.]

[9. The bowling ball defined in claim 1, wherein said inner core minimum specific gravity per pound of ball weight, is further characterized as being increased by the amount of 0.0562, to a value of 0.1625.]

[10. The bowling ball defined in claim 1, wherein said inner core minimum specific gravity per pound of ball weight, is further characterized as being increased by the amount of 0.0812, to a value of 0.1875.]

[11. The bowling ball defined in claim 1, wherein said inner core minimum specific gravity per pound of ball weight, is further characterized as being increased by the amount of 0.1062, to a value of 0.2125.]

[12. A bowling ball, comprising:

a) an inner core having a minimum specific gravity of 0.1063 per pound of ball weight, for balls ranging in weight from 8 to 16 pounds;

b) a molded outer core surrounding said inner core, wherein its specific gravity (can range) ranges downward to a minimum value of 0.38 for a specific fixed weight ball, to effectuate a decrease in ball moment of inertia;

c) (a top weight mass disposed within said ball;) the specific gravity of said inner core being greater than that of said outer core;

d) and a cover encapsulating said outer core;

e) said specific gravity values of said inner core, outer core, and cover, being selected (such as) to effectuate an increase in total kinetic energy output of said ball.]

[13. The bowling ball defined in claim 12, further characterized as including top weight mass.]

[14. The bowling ball defined in claim 13, wherein said top weight mass is further characterized as being integral to said inner core.]

[15. The bowling ball defined in claim 14, wherein said top weight mass is further characterized as being annular in shape.]

[16. The bowling ball defined in claim 15, wherein said inner core is further characterized as spherical in shape.]

[17. A bowling ball having (a top) weight mass positioned (such as) to effectuate a decrease in ball moment of inertia, comprising:

a) an inner core having a minimum specific gravity of 0.1063 per pound of ball weight, for balls ranging in weight from 8 to 16 pounds;

b) an annular shaped (top) weight mass located closely around said inner core;

c) and a molded encapsulating mass surrounding said inner core and said annular shape (top) weight mass.]

[18. The bowling ball defined in claim 17, wherein said molded encapsulating mass is further characterized as a cover.]

[19. The bowling ball defined in claim 18, wherein said annular shaped weight mass is further characterized as having its lower surface located at the midplane of the ball.]

[20. The bowling ball defined in claim 19, wherein said inner core is further characterized as being spherical in shape.]

[21. The bowling ball defined in claim 17, wherein said molded encapsulating mass is further characterized as comprising an outer core and a cover.]

[22. The bowling ball defined in claim 21, wherein said annular shaped weight mass is further characterized as having its lower surface located at the midplane of the ball.]

[23. The bowling ball defined in claim 22, wherein said inner core is further characterized as being spherical in shape.]

*.24. A bowling ball, comprising:*

*a) an inner core having a minimum specific gravity of 0.1625 per pound of ball weight, for balls ranging in weight from 8 to 16 pounds;*

*b) a molded encapsulating mass surrounding said inner core, wherein material adjacent to said inner core is further characterized as having a specific gravity ranging from 1.195 to 0.38 for a specific fixed weight ball within said ball weight range, to effectuate a decrease in ball moment of inertia;*

*c) said ball having a maximum circumference of 27.002 inches, a minimum circumference of 26.704 inches, and a minimum ball surface Durometer hardness of 72 Shore D;*

*d) said ball moment of inertia, of said fixed weight ball, decreases with an increase in inner core density, to effectuate an increase in the total kinetic energy output of said fixed weight ball.*

*25. The bowling ball defined in claim 24, wherein said molded encapsulating mass is further characterized as a cover.*

*26. The bowling ball defined in claim 25, further characterized as including top weight mass.*

*27. The bowling ball defined in claim 26, wherein said top weight mass is further characterized as being a part of said inner core.*

*28. The bowling ball defined in claim 24, wherein said molded encapsulating mass is further characterized as comprising an outer core and a cover.*

*29. The bowling ball defined in claim 28, further characterized as including top weight mass.*

*30. The bowling ball defined in claim 29, wherein said top weight mass is further characterized as being a part of said inner core.*

*31. The bowling ball defined in claim 24, wherein the upper specific gravity limitation of said material adjacent to said inner core, is further characterized as being reduced by the amount of 0.100 to a value of 1.095.*

*32. A bowling ball, comprising:*

*a) an inner core having a minimum specific gravity of 0.1063 per pound of ball weight, for balls ranging in weight from 8 to 16 pounds;*

*b) a molded encapsulating mass surrounding said inner core, wherein material adjacent to said inner core is further characterized as having a specific gravity ranging from 1.195 to 0.38 for a specific fixed weight ball within said ball weight range, to effectuate a decrease in ball moment of inertia;*

*c) the specific gravity of said inner core being greater than that of said material adjacent to said inner core;*

*d) said ball having a maximum circumference of 27.002 inches, a minimum circumference of 26.704 inches, and a minimum ball surface Durometer hardness of 72 Shore D;*

*e) said specific gravity values of said inner core, and said encapsulating mass, being selected to effectuate an increase in total kinetic energy output of said fixed weight ball.*

*33. The bowling ball defined in claim 32, wherein said molded encapsulating mass is further characterized as a cover.*

*34. The bowling ball defined in claim 33, further characterized as including top weight mass.*

*35. The bowling ball defined in claim 34, wherein said top weight mass is further characterized as being a part of said inner core.*

*36. The bowling ball defined in claim 32, wherein said molded encapsulating mass is further characterized as comprising an outer core and a cover.*

*37. The bowling ball defined in claim 36, further characterized as including top weight mass.*

*38. The bowling ball defined in claim 37, wherein said top weight mass is further characterized as being a part of said inner core.*

*39. The bowling ball defined in claim 32, wherein the upper specific gravity limitation of said material adjacent to said inner core, is further characterized as being reduced by the amount of 0.100 to a value of 1.095.*

*40. The bowling ball defined in claim 32, wherein said inner core minimum specific gravity per pound of ball weight, is further characterized as being increased by the amount of 0.0187, to a value of 0.1250.*

*41. The bowling ball defined in claim 32, wherein said inner core minimum specific gravity per pound of ball weight, is further characterized as being increased by the amount of 0.03745, to a value of 0.14375.*

*42. The bowling ball defined in claim 32, wherein said inner core minimum specific gravity per pound of ball weight, is further characterized as being increased by the amount of 0.0562, to a value of 0.1625.*

*43. The bowling ball defined in claim 32, wherein said inner core minimum specific gravity per pound of ball weight, is further characterized as being increased by the amount of 0.0812, to a value of 0.1875.*

*44. The bowling ball defined in claim 32, wherein said inner core minimum specific gravity per pound of ball weight, is further characterized as being increased by the amount of 0.1062, to a value of 0.2125.*

*45. A bowlinct ball having weight mass positioned to effectuate a decrease in ball moment of inertia, comprising:*

*a) an inner core having a minimum specific gravity of 0.1063 per pound of ball weight, for balls ranging in weight from 8 to 16 pounds;*

*b) an annular shaped weight mass located closely around said inner core;*

*c) and a molded encapsulating mass surrounding said inner core and said annular shaped weight mass.*

*46. The bowling ball defined in claim 45, wherein said molded encapsulating mass is further characterized as a cover.*

*47. The bowling ball defined in claim 46, wherein said annular shaped weight mass is further characterized as being a part of said inner core.*

*48. The bowling ball defined in claim 47, wherein said inner core is further characterized as being spherical in shape.*

*49. The bowling ball defined in claim 45, wherein said molded encapsulating mass is further characterized as comprising an outer core and cover.*

*50. The bowling ball defined in claim 49, wherein said annular shaved weight mass is further characterized as being a part of said inner core.*

*51. The bowling ball defined in claim 50, wherein said inner core is further characterized as being spherical in shape.*

* * * * *